United States Patent
Green et al.

(10) Patent No.: US 11,039,084 B2
(45) Date of Patent: Jun. 15, 2021

(54) METHOD FOR COMMISSIONING A NETWORK OF OPTICAL SENSORS ACROSS A FLOOR SPACE

(71) Applicant: VergeSense, Inc., Mountain View, CA (US)

(72) Inventors: Kelby Green, Mountain View, CA (US); Dan Ryan, Mountain View, CA (US)

(73) Assignee: VergeSense, Inc., Mountain View, CA (US)

( * ) Notice: Subject to any disclaimer, the term of this patent is extended or adjusted under 35 U.S.C. 154(b) by 0 days.

(21) Appl. No.: 16/191,115

(22) Filed: Nov. 14, 2018

(65) Prior Publication Data
US 2019/0149745 A1   May 16, 2019

Related U.S. Application Data

(60) Provisional application No. 62/585,942, filed on Nov. 14, 2017.

(51) Int. Cl.
*H04N 5/247* (2006.01)
*G06T 7/60* (2017.01)
(Continued)

(52) U.S. Cl.
CPC ............. *H04N 5/247* (2013.01); *G01S 3/00* (2013.01); *G06K 9/00624* (2013.01); *G06K 9/46* (2013.01); *G06K 9/6202* (2013.01); *G06T 7/60* (2013.01); *G06T 7/74* (2017.01); *H04N 1/00* (2013.01); *H04N 5/232* (2013.01);
(Continued)

(58) Field of Classification Search
None
See application file for complete search history.

(56) References Cited

U.S. PATENT DOCUMENTS 6,535,793 B2 * 3/2003 Allard .................... B25J 9/1689
                                                          318/628
6,580,424 B1 * 6/2003 Krumm .................. G06T 17/00
                                                          345/419

(Continued)

OTHER PUBLICATIONS

IP.Com search report.*

(Continued)

*Primary Examiner* — Mohammad J Rahman
(74) *Attorney, Agent, or Firm* — Run8 Patent Group, LLC; Peter Miller; Alexander R. Flake

(57) ABSTRACT

A method includes: accessing a floorplan representing the floorspace; and extracting from the floorplan a set of floorplan features representing areas of interest in the floorspace. The method also includes, calculating a set of target locations relative to the floorplan that, when occupied by the set of sensor blocks: locate the areas of interest in the floorspace within fields of view of the set sensor blocks; and yield a minimum overlap in fields of view of adjacent sensor blocks in the set of sensor blocks. The method further includes, for each sensor block in the sensor blocks installed over the floorspace: receiving, from the sensor block, an image of the floorspace; based on overlaps in the image with images from other sensor blocks in sensor blocks, estimating an installed location of the sensor block; and mapping the sensor block to a target location in the set of target locations.

19 Claims, 5 Drawing Sheets

(51) Int. Cl.
    *G06T 7/73*      (2017.01)
    *G06K 9/00*      (2006.01)
    *G06K 9/46*      (2006.01)
    *G06K 9/62*      (2006.01)
    *H04N 5/232*     (2006.01)
    *H04N 1/00*      (2006.01)
    *G01S 3/00*      (2006.01)

(52) U.S. Cl.
    CPC ............ *G06T 2207/10024* (2013.01); *G06T 2207/20221* (2013.01); *G06T 2207/30244* (2013.01)

(56) References Cited

U.S. PATENT DOCUMENTS

| | | | | |
|---|---|---|---|---|
| 8,878,773 | B1* | 11/2014 | Bozarth | G06T 7/74 345/156 |
| 9,786,097 | B2* | 10/2017 | Bell | G06T 19/003 |
| 9,836,885 | B1* | 12/2017 | Eraker | G06T 19/003 |
| 9,978,260 | B2* | 5/2018 | Lee | H04L 12/2818 |
| 10,397,495 | B1* | 8/2019 | Graber | B64D 47/08 |
| 10,659,737 | B2* | 5/2020 | Ryan | G06K 9/6218 |
| 2007/0070069 | A1* | 3/2007 | Samarasekera | G06F 16/748 345/427 |
| 2007/0279214 | A1* | 12/2007 | Buehler | G08B 13/19615 340/521 |
| 2008/0007720 | A1* | 1/2008 | Mittal | H04N 5/247 356/138 |
| 2009/0216501 | A1* | 8/2009 | Yeow | G06T 19/00 703/1 |
| 2010/0066559 | A1* | 3/2010 | Judelson | G06T 19/00 340/8.1 |
| 2010/0316257 | A1* | 12/2010 | Xu | G06K 9/00771 382/103 |
| 2011/0157396 | A1* | 6/2011 | Kotani | H04N 5/232 348/222.1 |
| 2012/0185094 | A1* | 7/2012 | Rosenstein | G05D 1/0251 700/259 |
| 2012/0307113 | A1* | 12/2012 | Peles | H04N 5/262 348/239 |
| 2013/0222599 | A1* | 8/2013 | Shaw | G06K 9/60 348/159 |
| 2014/0118339 | A1* | 5/2014 | Davies | G06T 3/60 345/419 |
| 2014/0210856 | A1* | 7/2014 | Finn | G01C 15/002 345/633 |
| 2015/0025842 | A1* | 1/2015 | Hodge | B63G 13/00 702/150 |
| 2016/0037082 | A1* | 2/2016 | Wang | G06T 5/006 348/65 |
| 2016/0188977 | A1* | 6/2016 | Kearns | G05D 1/0274 348/113 |
| 2016/0239976 | A1* | 8/2016 | Fathi | G06T 7/579 |
| 2017/0061763 | A1* | 3/2017 | Hanson | A61B 5/0077 |
| 2017/0220037 | A1* | 8/2017 | Berestov | G05D 1/0027 |
| 2017/0286761 | A1* | 10/2017 | Zackay | G06K 9/00771 |
| 2017/0301104 | A1* | 10/2017 | Qian | G06T 7/70 |
| 2018/0001481 | A1* | 1/2018 | Shah | G06Q 20/00 |
| 2018/0082414 | A1* | 3/2018 | Rozenberg | G06T 7/75 |
| 2018/0295327 | A1* | 10/2018 | Yearwood | B25J 11/002 |
| 2018/0321645 | A1* | 11/2018 | Caicedo Fernandez | G06K 9/03 |
| 2019/0043259 | A1* | 2/2019 | Wang | G06T 19/003 |
| 2019/0052820 | A1* | 2/2019 | Berner | H04N 5/345 |
| 2019/0089910 | A1* | 3/2019 | Banik | G06T 5/005 |
| 2019/0221003 | A1* | 7/2019 | Zhou | G06K 9/00771 |
| 2019/0304089 | A1* | 10/2019 | Moore | G06T 7/12 |
| 2020/0302188 | A1* | 9/2020 | Iwai | G08B 13/196 |

OTHER PUBLICATIONS

Mittal, Generalized Multi-Sensor Planning, Dept. Computer Science and Engg, IIT Madras.*
Khan et al., "Consistent Labeling of Tracked Objects in Multiple Cameras with Overlapping Fields of View", IEEE Transactions on Pattern Analysis and Machine Intelligence, vol. 25, No. 10, Oct. 2003.*
Tesfaye et al., "Multi-Target Tracking in Multiple Non-Overlapping Cameras using Constrained Dominant Sets", Computer Vision and Pattern Recognition, 2017.*

* cited by examiner

US 11,039,084 B2

METHOD FOR COMMISSIONING A NETWORK OF OPTICAL SENSORS ACROSS A FLOOR SPACE

CROSS-REFERENCE TO RELATED APPLICATIONS

This Application claims the benefit of U.S. Provisional Application No. 62/585,942, filed on 14 Nov. 2017, which is incorporated in its entirety by this reference.

This Application is related to U.S. patent application Ser. No. 15/973,445, filed on 22 May 2018 which is incorporated in its entirety by this reference.

TECHNICAL FIELD

This invention relates generally to the field of human and asset tracking and more specifically to a new and useful method for commissioning a network of optical sensors across a floorspace in the field of human and asset tracking.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1:
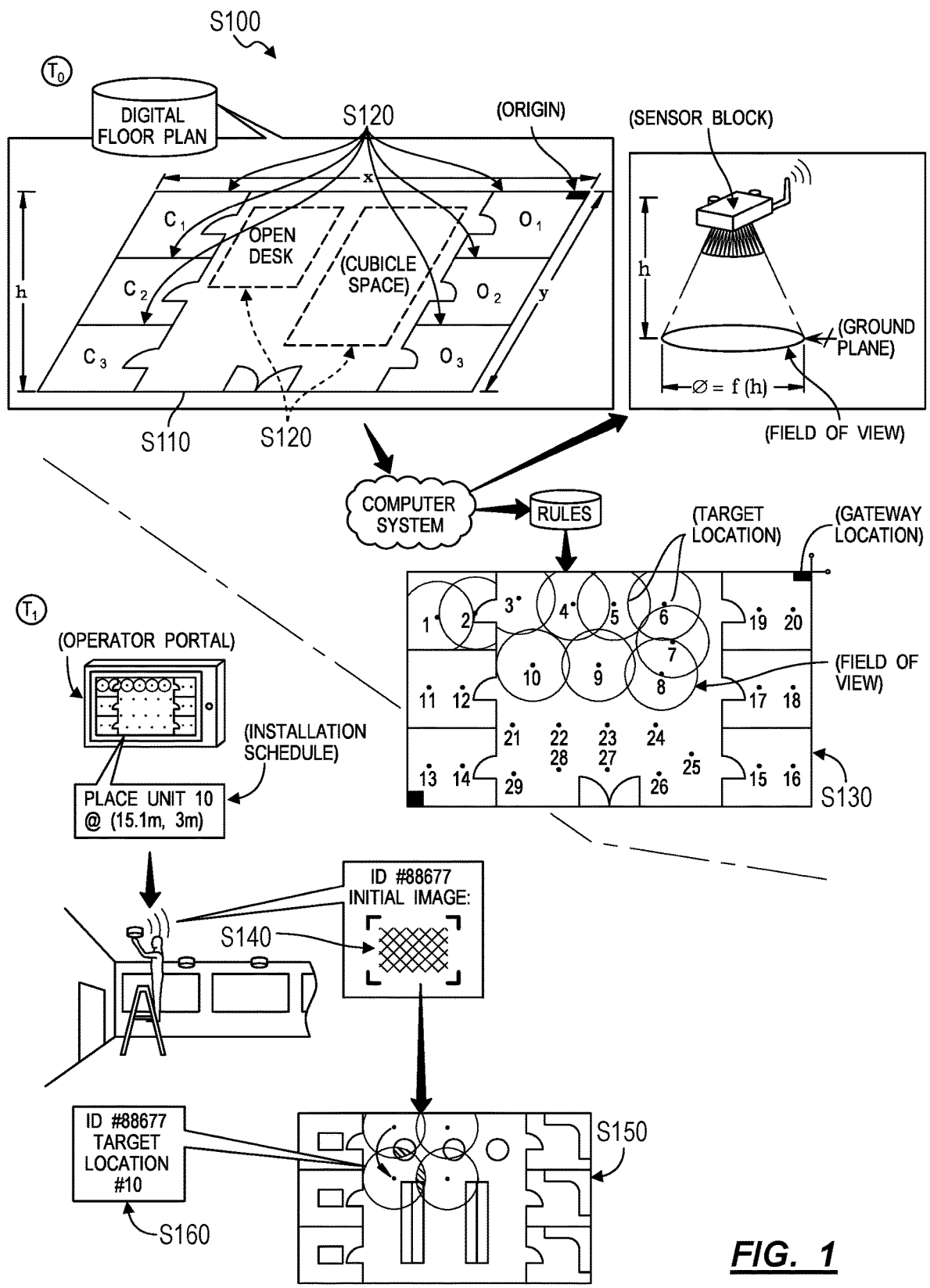
FIG. 1 is a flowchart representation of a method.

As shown in FIG. 1, a method S100 includes: accessing a digital floorplan representing the floorspace in Block S110; and extracting from the floorplan a set of floorplan features representing areas of interest in the floorspace in Block S120. The method S100 also includes, based on geometries of fields of view of a set of sensor blocks, calculating a set of target locations relative to the floorplan that, when occupied by the set of sensor blocks in Block S130: locate the areas of interest in the floorspace within fields of view of the set of sensor blocks; and yield a minimum overlap in fields of view of adjacent sensor blocks in the set of sensor blocks. The method S100 further includes, after installation of the set of sensor blocks over the floorspace, for each sensor block in the set of sensor blocks: receiving, from the sensor block, an image of the floorspace in Block S140; based on overlaps in the image with images from other sensor blocks in the set of sensor blocks, estimating an installed location of the sensor block in Block S150; and based on the installed location of the sensor block, mapping the sensor block to a target location in the set of target locations in Block S160.

One variation of the method S100 includes: accessing a digital floorplan representing the floorspace in Block S110; and extracting from the floorplan a set of floorplan features representing areas of interest in the floorspace in Block S120. The variation of the method S100 also includes, based on geometries of fields of view of a set of sensor blocks, calculating a set of target locations relative to the floorplan that, when occupied by the set of sensor blocks: locate the areas of interest in the floorspace within fields of view of the set of sensor blocks; and yield a minimum overlap in fields of view of adjacent sensor blocks in the set of sensor blocks in Block S130. The variation of the method S100 further includes, after installation of the set of sensor blocks over the floorspace, for each sensor block in the set of sensor blocks: receiving, from the sensor block, an image of the floorspace in Block S140; based on overlaps in the image with images from other sensor blocks in the set of sensor blocks, estimating an installed location of the sensor block in Block S150; and based on the installed location of the sensor block, mapping the sensor block to a target location in the set of target locations in Block S160. This variation of the method S100 also includes, based on the set of images of the floorspace, identifying a particular sensor block at an incorrect installed location in Block S170; and generating a prompt to correct the installed location of the particular sensor block in Block S180.

2. Applications

Generally, a system executes the method S100 to automatically develop a schedule (or "plan") for installing sensor blocks across a ceiling over a floorspace such that areas of interest in this floorspace fall within the combined fields of view of optical sensors (e.g., color camera, depth cameras) integrated into these sensor blocks once the sensor blocks are installed according to this plan. In particular, the system can calculate a set of target locations of sensor blocks, installed across a ceiling over a designated floorspace, such that each area of interest in the designated floorspace falls in the field of view of the optical sensor in at least one of these sensor blocks and that the fields of view of adjacent sensor blocks exhibit at least a minimum overlap.

The system can receive a digital floorplan representing the designated floorspace and automatically extract relevant features from the digital floorplan. For example, the system can detect walls, cubicle walls, desk locations, seat locations, conference tables, or any other feature of the floorspace. The system can then identify, from these extracted features, areas of interest of the floorplan, such as: conference rooms; cubicle areas; open desk areas; recreational areas; a lobby; a kitchen; private offices; and/or bathrooms; etc. Additionally or alternatively, the system can interface with a user—via a user portal—to define areas of interest in the floorplan.

The system can then generate target locations of sensor blocks over the floorspace based on these areas of interest and various other parameters, such as: a ceiling height over the floorspace, which may impact effective working distance for optical sensors in installed sensor blocks; various optical parameters of optical sensors in these sensor blocks, which may affect fields of view of these optical sensors as a function of working distance; a target minimum overlap between fields of view of optical sensors in adjacent sensor blocks, which may affect the system's ability to accurately combine discrete images from these sensor blocks into a composite image of the floorspace; etc.

The system can therefore leverage existing data, such as a floorplan representing the designated floorspace to generate a plan that includes a set of target locations for the installation of sensor blocks over the floorspace, such as prior to arrival of an installer at the designated floor, and serve this plan to an installer in order to guide the installer in placing sensor blocks in various target locations to achieve the specified minimum overlap and to fully encompass the designated areas of interest in the floorspace. For example, the system can serve the floorplan annotated with sensor block target locations to the installer. In another example, the system can serve target latitudinal and longitudinal locations of each sensor block to the installer in series, such as through an installer portal accessible through a web browser or native application executing on the installer's mobile computing device. Furthermore, the system can generate target orientations for the sensor blocks and, likewise, serve the target orientations to an installer in association with the target locations.

Alternatively, and as described below, the system can develop the sensor block plan in real-time based on little or no preexisting data of the designated floorspace. For example, as the installer installs each successive sensor block over the designated floorspace, the system can: access an optical image recorded by the last installed sensor block; merge this optical image with images recorded by preceding sensor blocks, if applicable, to form a composite image of a section of the floorspace; extract various data from the composite image, such as actual ceiling height, relative positions of installed sensor blocks, and positions of walls around the floorspace; and then calculate a target position of a next sensor block—such as relative to one or more previously-installed sensor blocks—based on data extracted from the composite images and various predefined rules for the sensor block installation, such as minimum field of view overlap, etc.

Blocks of the method S100 can therefore be implemented by the system to streamline setup, limit installation time, and realize installation parameters for a set of sensor blocks commissioned to a floorspace with minimal rework.

After installation of the sensor blocks over the designated floorspace, the system can confirm realization of the various predefined rules from which the system generated the target locations and/or orientations of the sensor blocks for the floorspace. For example, the system can receive one or more images (e.g., raw color images or feature-space images) from each of the sensor blocks and estimate an installed location of each sensor block and/or an installed orientation of each sensor block based on overlapping regions in these images detected automatically by the system. The system can then map each installed location and orientation to intended target locations over the floorspace to determine whether these sensor blocks fulfill the plan (e.g., whether these sensor blocks meet spatial and field of view overlap constraints outlined in the plan). If the installed locations and/or orientations of the sensor blocks deviate (e.g., by more than a predetermined threshold) from the target locations and/or orientations for the sensor blocks, the system can revise the set of target locations according to installed locations and orientations of these sensor blocks in order to minimize a number of sensor blocks requiring spatial repositioning in order to meet spatial and field of view overlap constraints for the floorspace. Additionally or alternatively, the system can identify, from a set of images received from the sensor blocks, whether areas of interest previously identified for the floorspace are located within the fields of view of the sensor blocks and with at least a minimum overlap between the fields of view of adjacent sensor blocks. Upon determining that an area of interest in this set is not fully located in the field of view of a particular sensor block, the system can calculate a modified set of target locations for this particular sensor block and/or other sensor blocks nearby in order to bring this area of interest into view across the set of installed sensor blocks. Additionally or alternatively, the system can generate a prompt indicating to a user that the area of interest is not fully located within the field of view of a particular sensor block. The user may then opt to spatially adjust the particular sensor block.

Once the set of sensor blocks are installed over the designated floorspace and the system has confirmed realization of the various predefined rules, the system can calculate latitudinal and longitudinal positions of discrete areas of the floorspace that fall within the field of view of each pixel in the optical sensor in each sensor block installed in the space. In particular, the system can link each pixel in each sensor block to a particular discrete location across the floorspace. During subsequent operation of this set of sensor blocks, the system can: collect images recorded by these sensor blocks, such as on a regular ten-minute interval; identify objects, such as people, chairs, tables, desks, etc. in these images; determine specific locations within the floorspace occupied by these objects; and thus track occupancy and asset use within the space in real-time and over extended periods of time.

Therefore, the system can: ingest a digital floorplan and extract floorplan features and areas of interest; calculate an installation plan including a set of target locations for the set of sensor blocks; check, after installation of the set of sensor blocks, to identify installation errors in the set of sensor blocks; verify with a user that the sensor blocks are properly positioned above the floorspace; and leverage data to track assets, humans, and monitor use within the floorspace over time.

3. System

Generally, the method S100 can be executed by one or more elements within the system to commission sensor blocks throughout an office space, manufacturing space, processing facility, or other space, etc. and to process images received from the set of sensor blocks after installation. Once installed throughout the space, these sensor blocks can collect optical data, such as in the form of one color image per ten-minute interval; and a local or remote computer system can extract various insights related to the use of the space and assets within the space from these optical data. The system can include one or more computational devices connected via a network (e.g., the Internet, LAN, etc.) to a local gateway. Furthermore, the local gateway is connected wirelessly to each of the sensor blocks to facilitate the receipt of images from the sensor blocks by the system.

3.1 Optical Sensor

Figure 4:
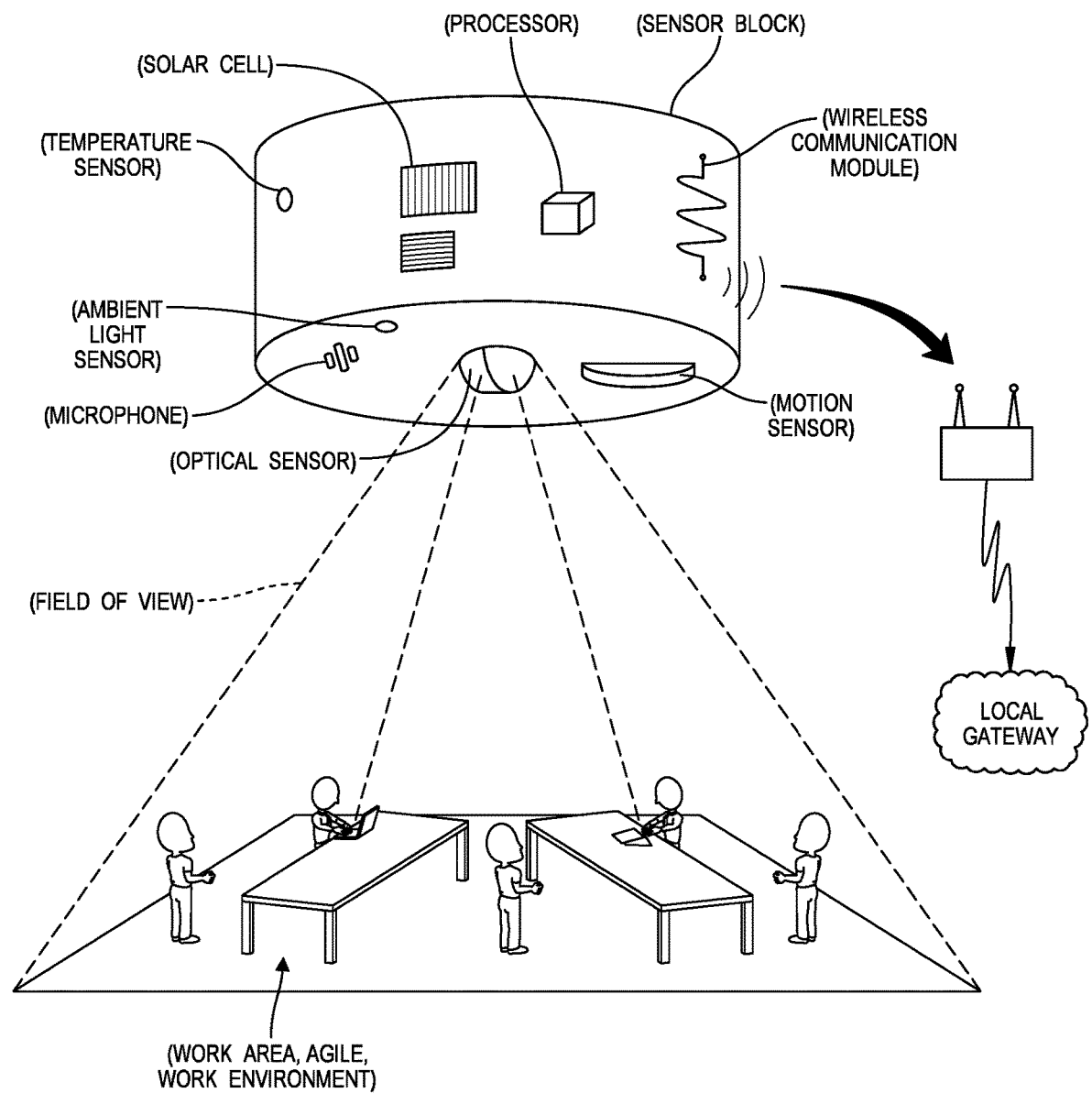
FIG. 4 is a schematic representation of a system.

As described in U.S. application Ser. No. 15/973,445 and as shown in FIG. 4, a sensor block can include: an optical sensor, such as a color camera; a battery; a wireless communication module configured to broadcast image data recorded by the optical sensor; and a controller; configured to selectively wake, trigger the optical sensor to record an image, write various metadata to the image, and then queue the wireless communication module to broadcast the image to the local gateway for processing. The optical sensor, battery, controller, and wireless communication module, etc. can be arranged within a single housing configured to install on a flat surface, such as a wall or ceiling, with the field of view of the optical sensor facing outwardly from the flat surface.

The optical sensor defines a field of view as a function of working distance from an adjacent surface. For example, a sensor block arranged on a ceiling with the optical sensor facing downward toward an open floor can define a field of view as a function of the ceiling height of the space at the location of the sensor block, wherein the field of view of the optical sensor increases with increased ceiling height. In this example, the controller can store various optical sensor properties, such as lens focal length and image sensor block size sets, which may define a relationship between field of view and working distance (e.g., ceiling height) of the optical sensor. The controller can also store a unique identifier (e.g., a UUID, MAC address, IP address, or other wireless address, etc.) and write this unique identifier, a timestamp, and optical sensor properties to an image prior to passing the image to the wireless communication module for transmission to the local gateway. Once commissioned to a space, the sensor block can wake, trigger the optical sensor to record an image, compile metadata with the image, transmit the image and metadata to a local gateway, and return to a sleep state (e.g., to limit power consumption), and repeat this process on a regular interval, such as once per ten-minute period. Multiple (e.g., dozens, hundreds) instances of the sensor block can be installed in a space and configured according to the method S100.

Alternatively, the working distance can also be defined as the distance between the optical sensor and a working plane of a floorspace. For example, if a user specifies that the system should track assets that are typically five feet above the floor of the floorspace, the system can define the working distance to be the distance from the floor to the ceiling of the floorspace, minus five feet.

2.2 Local Gateway

The system can also include a local gateway: configured to receive images from sensor blocks nearby via wireless communication protocol or via a local ad hoc wireless network; to extract various non-optical data from these images locally, such as presence and velocity of human occupants and common physical assets; and to offload these non-optical data—without corresponding optical images—to inform understanding, further use, and/or maintenance, etc. of the space, such as over a computer network or long-range wireless communication protocol. More specifically, the gateway can receive preprocessed non-optical "images" from each of the sensor blocks. In one implementation, images are received at the gateway as "feature-space" images, which identify the location of various features within the field of view of each sensor block without providing direct optical data of the original image. In this manner, the sensor blocks can anonymize the optical image captured at the optical sensor by transforming the optical image into a feature-space image before transmitting the feature-space image to the local gateway. The sensor blocks can transform optical images to feature-space images by implementing computer vision techniques to detect and extract features from an image, to associate features with one of a human, a chair, a desk or table, or other object of interest, and to pair the detected object of interest with a location (and orientation) in the field of view of the optical sensor that recorded the corresponding image.

In an alternative implementation, the local gateway can transform optical images received from the sensor into feature-space images before transmitting the images to the system over a network. In this implementation, the sensor blocks transmit the optical images to the local gateway and the local gateway implements the aforementioned computer vision techniques.

After receiving and/or transforming the optical images to feature-space images, the gateway can then offload the time, type, and relative location (and orientation) of the object of interest to the system for compilation with object of interest data extracted from images recorded at other sensor blocks in the space. One or more gateways can be installed in a space and can interface with many sensor blocks installed nearby to collect images, analyze these images locally, and return data extracted from these images to the remote computer system.

3.3 Computer System

The system further includes a remote computer system, such as a remote server, configured to receive non-optical data (e.g., feature-space images and associated metadata) from one or more gateways installed in a space and to transform these non-optical data into various insights related to use of a space and assets within the space over time.

When information related to the designated floorspace (e.g., a floorplan representing the designated floorspace) is available, the remote computer system can execute Blocks of the method S100 to calculate a set of target locations for a set of sensor blocks that achieve various predefined parameters, as described below. Alternatively, if certain data pertaining to the floorspace is not available, the remote computer system can execute a variation of the method S100 in real-time as data is collected from installed sensor blocks in order to guide an installer in placing a next sensor block according to the predefined parameters.

Once a set of sensor blocks and gateways are initially commissioned to a space, the remote computer system can execute Blocks of the method S100: to verify that the areas of interest in the floorspace are located within fields of view of optical sensors in the deployed sensor blocks; to verify sufficient overlap in fields of view of optical sensors in adjacent sensor blocks to enable images recorded by these sensor blocks to be stitched into one composite image of the designated floor surface; and to determine relative installed locations and installed orientations of these sensor blocks throughout the space, such as by roughly aligning fields of view of optical sensors by installation order and refining alignment of fields of view of these sensors based on like features captured in these images. In particular, the remote computer system can execute Blocks of the method S100 to map a set of installed sensor blocks to the calculated target locations for the sensor blocks; to configure a group of sensor blocks to collect localized, temporal data representing use of the space and assets within the space by humans, which may inform greater understanding, further use, and/or maintenance, etc. of the space.

(Alternatively, various Blocks of the method S100 can be executed locally by one or more gateways also installed in the space.)

2.4 Installer Portal

The system can also include or interface with an installer portal executing on an installer's computing device (e.g., a smartphone, tablet, or laptop computer) to serve sensor block location data to an installer, receive confirmation from the installer when a sensor block has been installed, etc. For example, the installer portal can execute within a native application or within a web browser on the installer's computing device.

(Furthermore, various Blocks of the method S100 can be executed locally by the installer portal.)

3.5 User Portal

The system can further include a user portal for assisting users with installation, rework, and operation of the system. The user portal can display various interfaces to a user of the system on a user's computing device (e.g., a smartphone, tablet, or laptop computer) including: input interfaces for specifying various parameters for calculating the target locations of the sensor blocks or otherwise configuring the system; notification interfaces for providing notifications regarding the installation and operational status of the system; and prompt interfaces that prompt the user to input specific information to aid in installation of the system.

4. Existing Floorplan

In one variation, the system accesses an existing floorplan of the designated space and calculates a set of target locations for a set of sensor blocks throughout the space in order: to achieve complete coverage of the space; and/or to achieve at least a minimum overlap of fields of view of optical sensors in adjacent sensor blocks, enable images from these sensor blocks to be stitched together into a single composite image, and thus enable the system to automatically determine relative orientations of the sensor blocks.

4.1 Floorplan Access

In Block S110, the system accesses a digital floorplan representing the floorspace. More specifically, an installer or other user can upload a digital copy of an architectural plan of the floorspace—such as including positions of walls, access points (i.e., doors), sub-divided spaces (e.g., conference rooms), structural columns, air vents, drop lighting, cubicle areas, seating areas, seat locations, desk locations, conference table locations, etc. within the floorspace—through the user portal, as shown in FIG. 1. For example, the user portal can access a digital scan of paper blueprints uploaded by the installer and then vectorize this digital scan. In another example, the system can retrieve an existing vectorized architectural plan for the floorspace from an Internet link—supplied by the user through the installer portal—to an online database.

4.2 Feature Extraction

Figure 2:
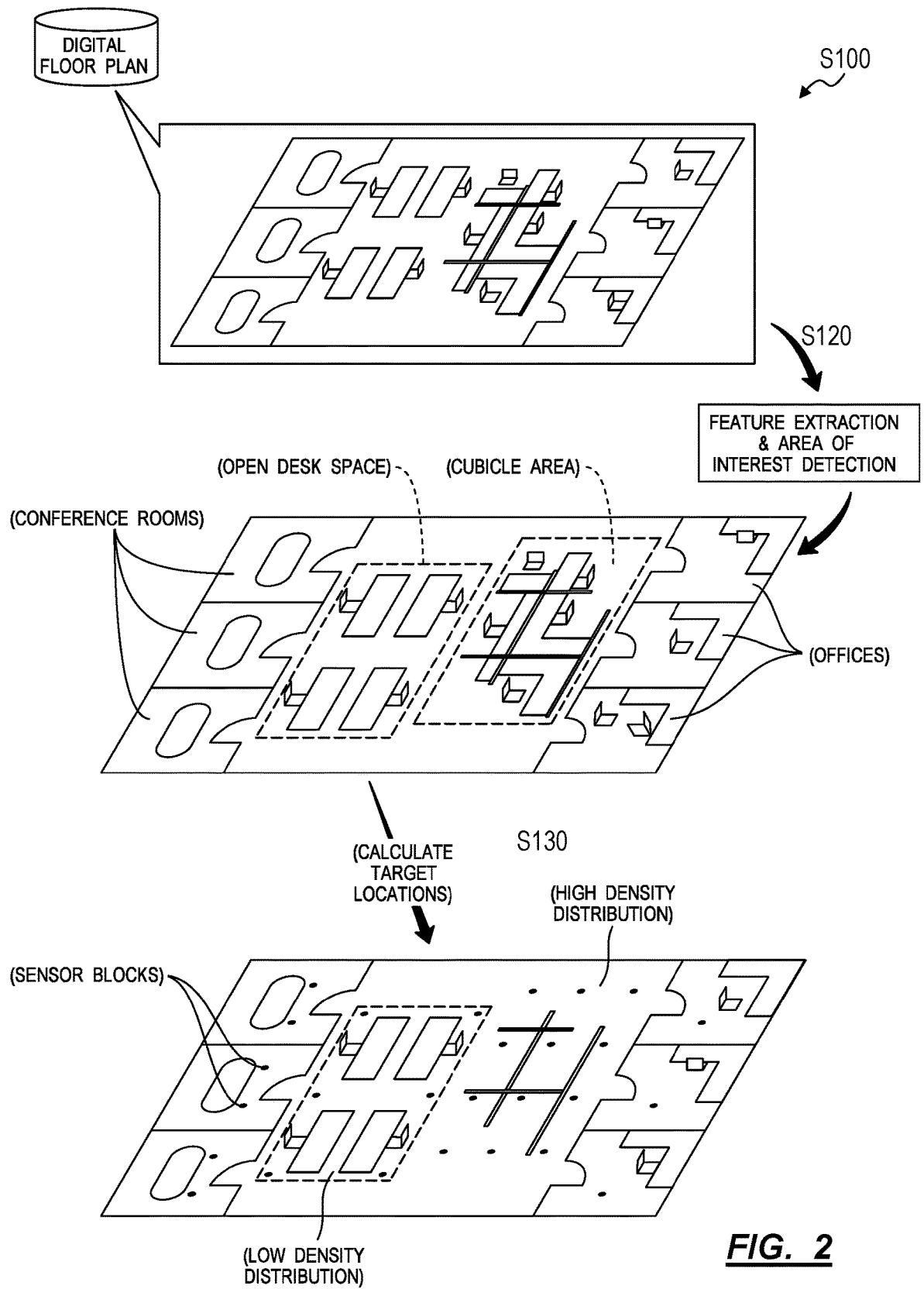
FIG. 2 is a flowchart representation of the method.

As shown in FIG. 2, the system can extract from the floorplan a set of floorplan features representing areas of interest in the floorspace in Block S120. More specifically, the system can implement template matching, edge detection, pattern matching, pattern recognition, optical character recognition, color recognition, content-based image retrieval, pose estimation, code reading, shape recognition, and/or any other suitable computer vision or processing technique to identify relevant features in the vectorized architectural plan, such as locations of walls, doors, dropped air vents, dropped ceiling lights, room partitions, etc. The user can then highlight, encircle, or otherwise designate a floorspace within the architectural plan to be monitored with a set of sensor blocks; and the system can extract a geometry of the designated floorspace from the architectural plan accordingly.

The system can also extract a set of floorplan features representing areas of interest in the floorspace. For example, upon detecting various features of interest such as cubicle areas, seating areas, and/or desk areas within the floorplan, the system can define areas of interest proximal to or encompassing those features. Likewise, the system can detect various obstructions within the floorspace and define areas of interest away from or in avoidance of the detected obstructions. Additionally, or alternatively, the system can prompt a user to confirm that detected areas of interest within the floorplan are actually areas of interest to the user of the system.

In one implementation, the system can extract floorplan features representing a cubicle area in the floorspace. By extracting features representing a cubicle area, the system can identify an area of the floorspace that may benefit from increased sensor block density when compared to other areas of the floorplan. Thus, the system can calculate different fields of view for sensors located over a cubicle area when compared to sensor located outside of the cubicle area due to the increased obstruction height of cubicle walls in the cubicle area. Additionally, or alternatively, the system can identify other areas of interest in the floorspace, such as an open desk area, a conference room area, an office area, and/or a recreational area.

The system can also extract from the floorplan a set of obstructions in the set of floorplan features, each obstruction characterized by an obstruction location, height, shape, and/or orientation. Obstructions can include cubicle walls, plants, lamps, screens, monitors, or any other relatively high object that may be positioned in the floorspace. The system can extract any of the above characteristics of each obstruction in the floorspace based on floorplan.

However, the system can extract any other floorspace features from the floorplan.

4.3 Ceiling Height

In the foregoing implementation, the system can also extract a ceiling height over the designated floorspace from the digital floorplan or from an architectural elevation similarly uploaded to the system. Alternatively, the user portal can prompt the user to manually enter a known or estimated ceiling height over the floorspace, such as once the installer arrives at the space and performs a ceiling height measurement.

Yet alternatively, the system can access or calculate a ceiling height directly from data received from one or more sensor blocks once installed over the floorspace by the installer. In one example, the installer installs a gateway in the space and then installs a first sensor block at a standard offset distance from a corner of a ceiling over a floorspace, such as suggested by default by the installer portal. In this example, the first sensor block includes a distance sensor, records a distance measurement—from the first sensor block to a floor below—via the distance sensor once the first sensor block is installed and activated, and returns this distance value to the installer portal executing on the installer's computing device nearby or to the remote computer system via the local gateway. The system can then store this distance value as a working distance for the designated floorspace.

In another example, the installer portal prompts the installer to install a first sensor block relative to a common feature (e.g., a ceiling corner) in the floorspace, as described above, and to install a second sensor block at a target offset distance from the first sensor block, wherein this target offset distance yields at least a minimum overlap between fields of view of optical sensors in the first and second sensor blocks given a minimum standard ceiling height (e.g., eight feet). Once the first and second sensor blocks are activated, each can record an image and return this image to the installer portal or to the remote computer system via a local gateway. The system can then: implement computer vision techniques to stitch these two images into a composite image—such as into a 3D point cloud of a volume below the first and second sensor blocks—based on the known target offset between the first and second sensor blocks; and extract an actual ceiling height of the space (i.e., a working distance) from this composite image. Furthermore, the system can implement similar methods to: prompt the installer to install a third sensor block, such as in a triangular pattern with the field of view of its optical sensor intersecting fields of view of optical sensors in the first and second sensor blocks; compile images from these three sensor blocks into a composite image; and then extract a ceiling height from this composite image, such as with even greater accuracy.

In one implementation, the system can extract, access, or request (via the user portal) a working plane for the floorspace. The system can define the working plane as a plane that is coplanar with surfaces of interest in the floorspace (e.g., the top surface of the desks in the floorspace, the top surface of seats in the floorspace, or the surface of the floor of the floorspace). After determining the working plane, the system can then calculate the effective ceiling height (i.e. the working distance for the optical sensors) by subtracting the working plane from the overall ceiling height.

However, the system can obtain a ceiling height for the floorspace in any other way.

4.4 Floorspace Parameters

In one implementation, the system can access a set of floorplan parameters representing various aspects of the floorspace that may not be detectable from the digital floorplan. For example, the system can access a ceiling height of the floorspace, a maximum obstruction height (or a set of obstruction heights corresponding to various obstructions located on the floorspace), and/or the variability of the floorspace (i.e. a floorspace variability). Alternatively, the system can estimate these parameters based on data associated with similar floorplans. Furthermore, the system can generate a prompt via the user portal requesting input of one or more of the aforementioned floorspace parameters.

As described above, the system detects various obstructions utilizing computer vision techniques applied to the digital floorplan. The system can then access obstruction heights for each type of obstruction. Alternatively, the system can estimate the obstruction height for each type of obstruction based on typical heights for each type of obstruction. In another alternative implementation, the system can generate a prompt, via the user portal, requesting an obstruction height for each obstruction from a user. As described below, the system can then consider the obstructions in calculating the field of view of each of the sensor blocks and therefore the target locations of the sensor blocks over the floorspace.

In one implementation, the system can access levels of floorspace variability from a predefined database in association with the floorplan. Alternatively, the system can prompt a user to indicate levels of floorspace variability for the floorspace as a whole or in particular areas of the floorspace. Floorspace variability indicates the probability of significant change to floorspace. For example, in an open floorplan office, the floorspace variability may be high, as desks and seats may be periodically reorganized throughout the floorspace. Contrastingly, a cubicle-based office plan may be characterized by low floorspace variability, as the cubicle walls may be semi-permanent and difficult to move. As described in further detail below, the system can increase the density of sensor blocks located over the floorspace in order to decrease the chances that additional sensors will need to be added if new obstructions are added to the floorspace.

4.5 Optical Sensor Field of View

Once the system accesses or calculates a ceiling height of the floorspace (or a working distance for sensor blocks installed over the floorspace), the system can automatically calculate the geometry of a field of view of an optical sensor—at the working plane of the floorspace—in a sensor block installed at this ceiling height based on optical properties of the set of sensor blocks and a ceiling height for the floorspace. The optical properties can include a lens focal length and an image sensor size in the optical sensor, as shown in FIG. 1. In addition to utilizing the optical properties of the sensor blocks and/or the optical sensor of the sensor blocks, the system can also calculate the geometries of fields of view of the sensor blocks based on particular floorspace parameters, such as the ceiling height of the floorspace, the maximum obstruction height of the floorspace, a set of obstruction heights of the floorspace, or any of the other floorspace parameters discussed above. Furthermore, the system can calculate the geometries of the fields of view of the sensor blocks as a function (e.g., a two-dimensional function defined relative to the floorplan) of the location of a sensor block over the floorplan. In this manner, the system can evaluate the effects of differing ceiling heights and obstruction locations and heights across the floorspace. For example, if an obstruction such as a cubicle wall blocks the field of view of a sensor block, the system can calculate the obstructed area of the working plane based on the height, shape, orientation, and location of the obstruction. Thus, the system can calculate the geometries of the fields of view of the set of sensor blocks based on optical properties of the sensor block, the ceiling height for the floorspace, and the obstruction height of each obstruction in the set of obstructions.

In one implementation, the system calculates the geometries of the fields of view of the set of sensor blocks based on optical properties of the sensor block, the ceiling height for the floorspace, and the maximum obstruction height. More specifically, the system operates under the assumption that an obstruction of a maximum height may be present at any location on the floorspace. The system can then calculate a conservative geometry of the field of view of each sensor block assuming an obstruction characterized by the maximum obstruction height will obstruct the field of view of the sensor block in multiple directions.

The system can also calculate different fields of view for different identified areas of the floorplan. For example, the system can calculate the geometries of the fields of view of the set of sensor blocks by: calculating a first geometry of a field of view of a sensor block installed in the cubicle area; and calculating a second geometry of a field of view of a sensor block installed outside of the cubicle area. The system can calculate the first and second geometries by assuming a first and second maximum obstruction height for each of the areas corresponding to the first and second geometries.

In one implementation, the system can calculate fields of view of the sensor blocks as a probability distribution. More specifically, the system can calculate the field of view of each sensor block based on an installation error probability distribution, which accounts for typical installation errors. The system can access probability distributions of typical latitudinal and longitudinal installation errors, orientation installation errors, or any other installation errors, and apply the probability distributions to previously calculated fields of view for the sensor blocks. The system can then calculate a set of target locations for the sensor blocks such that the probability that the areas of interest in the floorspace are fully located within the fields of view of the sensor blocks surpasses a preset probability threshold.

4.6 Minimum Overlap

Before calculating the target locations for the set of sensor blocks, the system can calculate, access, or receive (via the user portal) a minimum overlap between fields of view of the set of sensor blocks. Generally, a minimum overlap is specified in order: to determine installed locations of the sensor blocks relative to each other; to generate a composite image by stitching together images from multiple sensor blocks; and to preempt errors in installation such that all areas of interest may remain located within the fields of view of the sensor blocks even with expected installation errors.

In one implementation, the system can determine a minimum overlap based on the geometries of the fields of view of the set of sensor blocks and the floorspace variability.

Thus, the system can determine a minimum overlap depending on the floorspace variability such that the calculated target position of the sensor blocks is robust to changes in the floorspace.

Additionally or alternatively, the system can calculate a first minimum overlap of a sensor block installed in the cubicle area; and calculate a second minimum overlap of a sensor block installed outside of the cubicle area. Generally, the system can determine different minimum overlaps for different regions of the floorspace to account for differences in obstruction height, floorspace variability, or any other floorspace parameter.

4.7 Calculating Target Locations

In Block S130, the system can, based on geometries of fields of view of a set of sensor blocks, calculate a set of target locations relative to the floorplan that, when occupied by the set of sensor blocks: locate the areas of interest in the floorspace within fields of view of the set of sensor blocks; and yield a minimum overlap in fields of view of adjacent sensor blocks in the set of sensor blocks. Generally, the system can calculate target locations of sensor blocks that encompass the areas of interest in the floorspace within the collective fields of view of the sensor blocks with at least a minimum field of view overlap between adjacent sensor blocks.

In one implementation, the system implements a set of rules to automatically calculate target sensor block locations, such as: achieve full coverage of the areas of interest in the floorspace; achieve at least a minimum overlap of fields of view of adjacent sensors (e.g., at least 10% overlap by area between fields of view of optical sensors of two adjacent sensor blocks installed in space); minimize a total number of installed sensor blocks; and limit sensitivity to installation errors for the sensor blocks. The system can then automatically calculate target locations of sensor blocks over the floorspace to fulfill these rules, such as by: projecting a grid array of sensor block locations over the geometry of the floorspace extracted from the digital floorplan; calculating adherence of these layouts to the predefined rules; removing and/or adjusting sensor block locations to improve alignment with the predefined rules; and repeating this process until the system converges on a solution of sensor block locations that best achieve these predefined rules. Thus, the system can solve multidimensional optimization problems according to a number of predefined parameters or functions relative to various locations in the floorplan.

The system can then: store the latitudinal and longitudinal positions of each sensor block location, such as relative to an origin defined at a corner of the designated floorspace or defined arbitrarily relative to the floorplan; and/or insert a sensor block indicator at each target location in the digital floorplan to complete the sensor block plan, as shown in FIG. 1.

Alternatively, the installer or other user can manually populate the floorplan with locations of sensor blocks, such as by selecting pixels in the architectural plan to indicate each sensor block location, within the user portal. The system can: analyze these manually-selected sensor block locations to confirm that sensor blocks installed according to this plan fulfill predefined rules, such as described above; provide visual feedback to the user to adjust the sensor block locations in the installer portal; and generate the sensor block plan once sensor block locations are fully defined and meet the predefined rules described above.

In one implementation, the system can also calculate target orientations for the sensor blocks over the floorspace. Thus, the system can improve adherence to the set of rules by modifying the orientation of each sensor block in order to reduce the number of sensor blocks or improve coverage of areas of interest in the floorspace.

Additionally or alternatively, the system can adapt or reevaluate the field of view of each sensor depending on a proposed target location for the sensor block. Thus, the system can evaluate a field of view function to determine the field of view of each sensor block based on the location of the sensor block relative to the floorplan.

In one implementation, the system can calculate a set of target locations based on the first geometry of the field of view of a sensor block installed in the cubicle area and the second geometry that: locate the areas of interest in the floorspace within fields of view of the set sensor blocks; yield the first minimum overlap in fields of view of adjacent sensor blocks in a subset of sensor blocks over the cubicle area in the set of sensor blocks; and yield the second minimum overlap in fields of view of adjacent sensor blocks in a subset of sensor blocks.

However, the system can implement any other method or technique to generate a sensor block plan based on a known geometry of the designated floorspace.

4.8 Installation

The system can then serve guidance to the installer—such as by indicating absolute or relative target locations of sensor blocks over the floorspace according to the sensor block plan—via the installer portal as the installer completes the installation; and aid in mapping particular sensor block addresses (e.g., UUIDs for each sensor) with particular target locations. For example, the installer portal can render the floorplan with dimensioned target locations for the sensor blocks and or generate a print out of the floorplan overlaid with the target locations and/or orientations. Additionally, the system can provide various means for mapping each sensor block address to the corresponding target location for that sensor block. By generating an initial mapping between the sensor blocks and the target locations, the system can improve detection of installation errors via the installation process carried out by the installer.

In this implementation, the system can also monitor installation order of sensor blocks over the floorspace. For example, when a sensor block is installed and activated by the installer, the sensor block can broadcast its address (and/or a query, an initial image, etc.) to the remote computer system via a local gateway or to the installer's computing device directly. Upon receipt of this sensor block's address, the system can: associate this sensor block's address with a sensor block location currently indicated as in-process in the sensor block plan, such as by storing this association in a lookup table; mark the current sensor block location as complete; and then prompt the installer to move on to a next sensor block location in the sensor block plan.

In an alternative implementation the system can, for a particular target location, generate a visual identifier corresponding to the particular target location. Subsequently, after installation of the set of sensor blocks over the floorspace, the system can, for each sensor block in the set of sensor blocks: detect the visual identifier in the image of the floorspace; and based on a particular target location corresponding to the visual identifier, map the sensor block to a target location in the set of target locations. In this manner, the system can initially map each sensor block to the target locations. The initial mapping of the sensor blocks can be further verified using computer vision techniques further described below.

For example, the system can generate the visual identifier via the installer portal for display on a portable computational device. Then, upon activating a sensor block, the sensor block can take an image of the floorspace below the sensor block including the installer's device that is displaying the visual identifier. The system can thus map the address of the sensor block to the target location indicated by the visual identifier.

In an alternative example, the system can generate printable visual identifiers. The installer may then print the visual identifiers and, upon installation of each sensor block, place a printed visual identifier within the field of view of the sensor block such that when the sensor block is activated, the sensor block can detect the visual identifier and the system can subsequently map the address of the sensor block to the location indicated by the visual identifier. In one implementation, the visual identifier is a QR code indicating a particular target location in the set of target locations.

In yet another implementation, the system can aid in implementing a hybrid installation approach by monitoring the installation order of the sensor blocks and generating visual identifiers that correspond to individual installers. Thus, multiple installers can follow separate installation plans simultaneously while placing a visual identifier indicating the installer responsible for each sensor block within the field of view of the sensor blocks. Upon installation, the sensor blocks can take an image of the floorspace including the visual identifier. Based on the visual identifier in the image taken by each sensor block, the system can then sort the sensor blocks by installer and assign target locations to each sensor address according to a predefined installation order corresponding to each installer.

However, the system can implement a variety of other methods in cooperation with one or more installers in order to map intended target locations with addresses of sensor blocks installed over the floorspace.

Furthermore, as a sensor block is installed and activated or upon installation of a last sensor block specified in the sensor block plan, the system can implement methods and techniques described below to determine an orientation of each sensor block relative to adjacent sensor blocks based on transformations that align features detected in an image received from one sensor block to like features detected in images received from sensor blocks associated with adjacent sensor block locations.

4.9 Image Acquisition and Formatting

As described in U.S. application Ser. No. 15/973,445, upon installation and activation over a floorspace, a sensor block in the set of sensor blocks can periodically (e.g., once every ten minutes) activate the optical sensor (e.g., camera) to obtain an optical image of the floorspace within the field of view of the sensor block. The sensor block then extracts a set of anonymized (i.e. non-optical) features from the optical image, which may represent various aspects of the image. The sensor block can perform edge detection or any other computer vision technique before applying an image classifier to distinguish various aspects of the optical image. Generally, the sensor block can detect and represent various aspects of the image as a "feature-space" image where the pixels of the actual optical image are obscured and instead the extracted features are represented at the same scale. For example, the sensor block can detect desks, conference tables, chairs, sofas, cubicle walls, people, etc. that may be present on the floorspace. The sensor block can then convert the optical image containing the above objects into a feature-space image which represents each of the above features of the images a generic versions of themselves scaled to the appropriate size and scale. If the sensor block can detect an object within the optical image but cannot classify it as a particular type of feature, the system can vectorize the optical representation of the object and represent the vectorized representation in the feature-space image.

In one implementation, the sensor block can further identify trackable assets from the feature-space image. The trackable assets can be particular mobile equipment or people that may move around the floorspace. The sensor block can label the trackable assets present in the feature-space image—alternatively, the system can label trackable assets after receiving the feature-space image from the sensor block.

In one implementation, the optical sensor is intentionally low resolution in order to prevent identifiable characteristics of assets from being detected at the sensor.

4.10 Image Reception

The system can receive, from the sensor block and via the wireless gateway, an image of the floorspace in Block S140. In one implementation, the image is a feature-space image and does not include any identifying characteristics from the optical image taken at the sensor block. Thus, the system can receive, from a sensor block, a feature-space image generated at the sensor block from an optical image of the floorspace, the feature-space image identifying a set of features extracted from the optical image. Feature-space images can also be referred to as "images" throughout this application.

In one implementation, the system can receive from the sensor block a feature-space image, the feature-space image identifying the set of features extracted from the optical image, the set of features comprising at least one of: a desk space; a seating location; an anonymized person; a cubical divider; and a conference table. However, the system can identify any other visually detectable asset that may be present on the floorspace.

The sensor blocks can transmit the feature-space images to the local gateway via any standardized wireless protocol or a custom wireless protocol.

5. Absent Floorplan

In one variation, the system develops the sensor block plan in real-time based on data collected from sensor blocks as these sensor blocks are installed over a designated floorspace and activated, such as in the event that an architectural plan of the floorspace is unavailable. In particular, in this variation, the installer can begin installation of sensor blocks in the designated space without an initial sensor block plan, and the system can: collect various sensor data from sensor blocks as these sensor blocks are installed; extract relative sensor block locations from these sensor data; check these relative sensor block locations against various predefined rules, such as described above; and serve guidance to the installer substantially in real-time, such as through the installer portal, for correction of a current sensor block and/or placement of a next sensor block to complete the installation.

5.1 Ceiling Height

In this variation, the system can implement methods and techniques described above to access or determine a ceiling height of the floorspace, such as by: prompting the installer to enter a ceiling height dimension into the installer portal; receiving a distance value from a distance sensor integrated into a first sensor block installed in the space; or extracting a ceiling height dimension from a composite image of images received from the first few sensor blocks installed in the space according to an indicated target offset distance between these sensor blocks; etc.

5.2 Real-Time Guidance

Once the ceiling height of the space is thus received or calculated, the system can provide real-time guidance—for placement of each subsequent sensor block—to the installer via the installer portal.

For example, once the first sensor block (or first set of sensor blocks) is installed in the space and a ceiling height of the space is received or determined, the system can: calculate a geometry of the field of view of a sensor block at a ground plane (e.g., across the floor of the space); calculate a maximum offset distance between the first sensor block and a second sensor block to achieve a minimum overlap of fields of view of optical sensors in the first and second sensor blocks once the second sensor block is installed; calculate a target offset distance that is less than (e.g., 5% less, six inches less) the maximum offset distance in order to accommodate offset common locational tolerances of sensor block installations; and serve a prompt to the installer—via the installer portal—to install the second sensor block at the target offset distance from the first sensor block (or less than the maximum offset distance from the first sensor block), such as at any angular offset from the first sensor block or that locates the first and second sensor blocks at a similar normal offset distance from an adjacent wall.

Based on the relative position of the second sensor block to the first sensor block and the working plane or ground plane area within the fields of view of the first and second sensor blocks, the system can then implement methods and techniques similar to those described above to: calculate maximum offset distances between the first sensor block and a third sensor block and between the second sensor block and the third sensor block to achieve a minimum overlap of fields of view of optical sensors in the first, second, and third sensor blocks once the third sensor block is installed; transform these maximum offset distances into target offset distances; serve a prompt to the installer—via the installer portal—to install the third sensor block at a first target offset distance from the first sensor block and at a second target offset distance from the second sensor block. The system can thus serve a set of dimensions—to the installer via the installer portal—to fully constrain placement of the third sensor block and to locate the third sensor block relative to the first and second sensor blocks such that the field of view of the optical sensor in the third sensor block sufficiently overlaps fields of view of optical sensors in the first and second sensor blocks at the working plane.

Once installed and activated, the third sensor block can record an image and return this image to the installer's computing device or to the remote computer system via the local gateway. The system can then align this image from the third sensor block with the 2D scalar map of the working plane floor area in view of the first and second sensor blocks based on like features in this third image and the working plane floor area and based on known or expected offset distances between the third sensor block and the first and second sensor blocks. The system can then update the 2D scalar map of the working plane floor area to reflect the working plane floor area in the field of view of the third sensor block. The system can also confirm that the minimum overlap between the fields of view of the first, second, and third sensor blocks has been achieved based on alignment of like features or based on lack of alignment between features in images received from these three sensor blocks; if this overlap is insufficient, the system can serve a prompt—to the installer via the installer portal—to adjust location of the third sensor block, such as by moving the third sensor block closer to one or both of the first and second sensor blocks, in order to achieve this minimum overlap.

5.3 Wall Detection

In one implementation, the system can detect walls within fields of view of installed sensor blocks. For example, as additional sensor blocks are installed, activated, and offload initial images to the installer's computing device or to the remote computer system, the system can stitch these images into a 3D point cloud of the space based on: the order in which these sensor block are activated and connect to the local gateway or to the installer's computing device; suggested placement of each subsequent sensor block; an indicated, measured, or calculated ceiling height at each sensor block; and like overlapping features in images recorded by adjacent sensor blocks. As the system constructs this 3D point cloud, the system can detect vertical surfaces extending from the working plane (at the working distance from the sensor blocks) by more than a threshold distance (e.g., by more than two meters) and label these vertical surfaces as walls. The system can then crop fields of view of optical sensors in sensor blocks installed near walls in the space according to the positions and geometries of these walls relative to these sensor blocks.

The system can also project these wall surfaces represented in the 3D point cloud onto the 2D map of ground areas in the field of view of each installed sensor block, thereby developing a representation of both the perimeter of the space and areas within this space that fall within fields of view of the sensor blocks currently installed. The system can regularly update and serve this 2D map of visible ground areas to the installer via the installer portal as additional sensor blocks are installed and activated in order to visually communicate installation progress to the installer.

6. Installation Location Detection

Once installed and activated, each sensor block can record an image and transmit this image to the installer's computing device or to the remote computer system via the local gateway. After receiving a set of roughly concurrent images from the set of sensor blocks the system can, based on overlaps in the image with images from other sensor blocks in the set of sensor blocks, estimate an installed location of each sensor block in Block S150. The system can then align this image from a second sensor block with an image from a first sensor block and/or any other adjacent sensor blocks based on like features in these two images and the expected distance between each adjacent sensor blocks (i.e., the target offset distance). In particular, the system can calculate a transformation that aligns the like features in these two images. The system can then form a composite image from these two images, such as a 2D scalar map of a working plane floor area within the fields of view of the adjacent sensor blocks.

In particular, the system can: extract a position and orientation of a second sensor block relative to an adjacent first sensor block based on a transformation that maps features detected in the second image to like features detected in the first image; and store these data, such as in a lookup table or other database. Based on these relative positions and orientations of the first and second sensor block, the system can assemble fields of view of these sensor blocks into a map of ground areas in the field of view of each sensor block. Once the space is fully outfitted with sensor blocks and gateways, the system can determine the relative locations and movements of objects (e.g., people and assets) occupying and moving through the space based on images collected from these sensor blocks over time. Additionally, the system can compile the extracted relative positions and relative orientations of adjacent sensor blocks to constrain the set of sensor blocks relative to each other. The system can record the constrained relative locations and orientations of the sensor blocks as the installed locations and/or the installed orientations of each sensor block. Thus, the system can then detect deviations between the target locations and/or target orientations and the installed locations and/or orientations of the sensor blocks.

In implementations where visual indicators or other methods have not been implemented to determine an initial mapping between the sensor blocks and, the system can, based on the installed location of the sensor block, map the sensor block to a target location in the set of target locations based on the alignment of like features across images received from the set of sensor blocks in Block S160. For example, the system can take a set of images received from sensor blocks and arrange them according to like features in overlapping regions of each image and by applying transformations to each image to align the like features. Based on the transformations required to align the like features in each image, the system can determine the relative locations of each sensor block in the set of sensor blocks. The system can then scale, rotate, and roughly align the relative locations to map the sensor blocks with the set of target locations, thereby minimizing the error between the determined relative locations and the target locations. The system can also simultaneously determine the installed locations by defining a global location to one of the relative locations determined via image analysis. Thus, the system can estimate the installed location of the sensor block by: assembling an image from a first sensor block and the images from other sensor blocks into a composite image of the floorspace based on like features detected in images received from adjacent sensor blocks, in the set of sensor blocks; and estimating the installed location based on the position of the image within the composite image.

Generally, the system can identify, based on the set of images of the floorspace, a particular sensor block at an incorrect installed location in Block S170. More specifically, the system can compare the installed locations and or installed orientations with the target locations and/or target orientations mapped to each sensor block based on the initial mapping. Upon detecting location deviations greater than a threshold deviation and/or orientation deviations greater than a threshold orientation, the system can prompt an installer, via the installer portal, and/or a user via the user portal to adjust the locations and/or orientation of the sensor blocks as further described below. Thus, the system can, for each sensor block in the set of sensor blocks: detect a position deviation between the installed location of the sensor block and the target location of the sensor block; and detecting an orientation deviation between the installed orientation and the target orientation.

The system can also confirm that the minimum overlap between the fields of view of the first and second sensor blocks has been achieved based on alignment of like features or based on lack of alignment between features in these images recorded by the first and second sensor blocks; if this overlap is insufficient, the system can serve a prompt—to the installer via the installer portal or to the user via the user portal—to adjust the location of one or more sensor blocks, such as by moving the second sensor block closer to the first sensor block, in order to achieve this minimum overlap.

Furthermore, the system can also confirm that the initial mapping between sensor block addresses and target location is accurate. The system determines adjacent sensor blocks for comparison of like features based on the initial mapping of the sensor blocks to the set of target locations. The system can then compare like features between images received from adjacent sensor blocks. If like features cannot be detected between purportedly adjacent sensor blocks, then the system can flag the sensor blocks as possibly being incorrectly located or mapped to the set of target locations.

7. Installation Completion

The system can repeat the foregoing processes to guide installation of each subsequent sensor block in the space until the designated floorspace is fully visible in the fields of view of these installed sensor blocks.

The system can cease executing these processes once the installer manually indicates that the installation is complete via the installer portal. Alternatively, the system can: automatically determine that the installation is complete, such as by detecting a continuous wall or continuous wall with one or more access points encompassing a contiguous floor area represented in the 2D map; automatically indicate to the installer via the installer portal that the installation is complete; and cease executing the foregoing processes accordingly.

Alternatively, the system can, based on a set of installed locations comprising the installed location of each sensor block in the set of sensor blocks and the set of target locations, verify that the set of installed locations: locate the areas of interest in the floorspace within fields of view of the set sensor blocks; and yield the minimum overlap in fields of view of adjacent sensor blocks in the set of sensor blocks. The system can implement this verification process by executing computer vision techniques to identify features of the floorspace that correspond to features extracted from the floorplan and locating these features relative to the installed locations of the sensor blocks. The system can then determine the level of alignment between the identified features from the images of the floorspace and the extracted features from the floorplan representing the floorspace. If the system calculates an alignment greater than a threshold alignment, the system can terminate the installation process and begin normal operation of the sensor blocks.

8. Installation Error Correction

Figure 3:
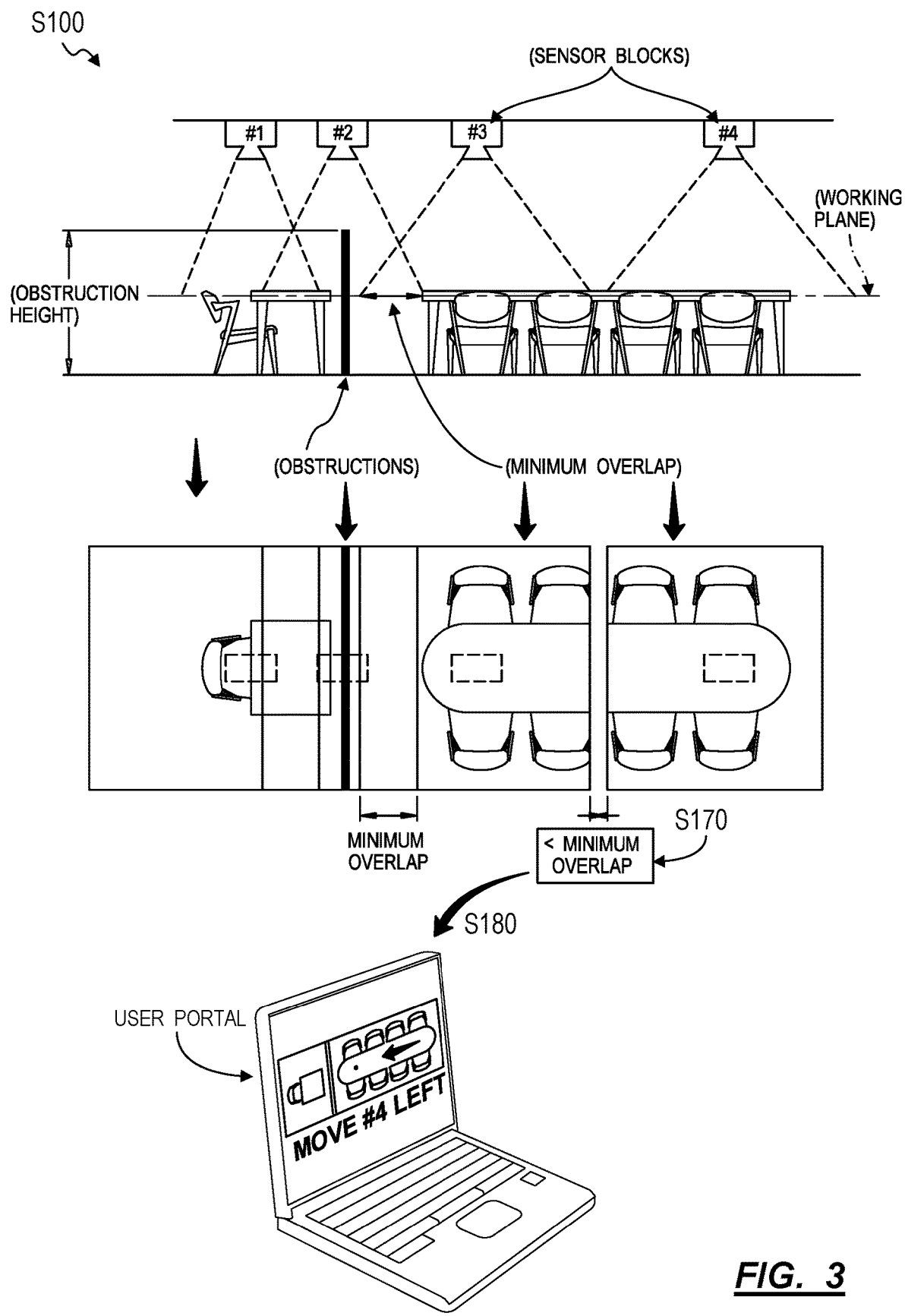
FIG. 3 is a flowchart representation of the method.

As shown in FIG. 3, the system can also detect installation errors for particular sensor blocks and generate prompts— via the user portal or the installer portal—to correct the installed location of the particular sensor block in Block S180. For example, the system can identify several installation errors, including location installation errors, orientation installation errors, and/or mapping installation errors.

Generally, the system can, in response to the position deviation exceeding a position deviation threshold or the orientation deviation exceeding an orientation deviation threshold, calculate a modified set of target locations specifying a set of adjustments to installed location of the set of sensor blocks. More specifically, the system can identify location and orientation installation errors in at least two ways. First, the system can detect, as discussed above, that an installed location and/or orientation of a sensor block deviates, by greater than a threshold location and threshold orientation respectively, from a target location or target orientation mapped to the sensor block. The system can calculate a correcting adjustment to the installed locations by simply prompting an installer—via the operator prompt—to correct the deviation that is greater than the threshold. For example, if the system detects a location deviation of five inches along the longitudinal axis for a particular sensor block, the system can prompt an installer to relocate the particular sensor block five inches along the longitudinal axis in the opposite direction of the deviation to correct for the deviation. If the system detects multiple deviations greater than the corresponding thresholds, the system can compile the deviations into a modified set of target locations specifying a set of adjustments to the existing set of installed locations.

Generally, the system can: determine, based on the installed location and the installed orientation of each sensor block, whether the areas of interest of the floorspace are located within the fields of view of the set sensor blocks; and, in response to determining the areas of interest of the floorspace are not located within the fields of view of the set of sensor blocks, calculate a modified set of target locations specifying a set of adjustments to installed location of the set of sensor blocks. More specifically, the system can detect that portions of the areas of interest are not located within the field of view of the set of sensor blocks or that the minimum overlap between the fields of view of the sensor blocks is not present between at least one pair of adjacent sensor blocks. In one implementation, the system detects this by comparing features extracted from the floorplan with like features detected in images of the floorspace. In this case, the system can recalculate a set of modified target locations (e.g., by recalculating the previously discussed optimization problem) given the set of installed locations of the sensor blocks. The system can further constrain the optimization problem by allowing the user—via the user portal—to specify a subset of the installed sensor blocks that are properly installed such that the system only relocates sensor blocks that are proximal to the missing areas of interest and/or the lack of overlap between the fields of view of the sensors.

The system can also, based on the set of images of the floorspace, identify a particular sensor block at an incorrect installed location in Block S170. Generally, the system can identify a mapping error wherein—due to an error in the installation process or a post installation mapping process—a sensor block is mapped to a particular target location that does not correspond to the sensor block's actual installed location. This can occur because an installer has made visible a visual identifier corresponding to a particular target location that does not correspond with the actual target location for which a sensor block was installed. As a result, the system may map the sensor block to an incorrect target location. The system can detect a mapping error by attempting to create a composite image based on the mapped target locations of the set of sensor blocks and failing to locate like features between two images from sensor blocks mapped to adjacent target locations. If no like features are detected, the system can attempt to find like features in any of the other images in the set of images received from each of the sensor blocks. If like features are detected in images received from sensor blocks that are not mapped to adjacent target locations, the system detects a mapping error.

The system can execute a number of responses to detecting a mapping error. In one implementation, the system generates a notification indicating a conflict between the installed location and the particular target location corresponding to the visual identifier and identifying the sensor block. More specifically, the system can distribute the notification via either the user portal or the installer portal. Additionally or alternatively, in Block S180 the system can generate a prompt requesting a selection from a user of a mapping between a target location of the set of target locations and the sensor block. In one implementation, the system can also automatically map the sensor block to a target location proximal the installed location.

9. Pixel Location

Once the installation is complete and the system has compiled images received from each sensor block into one 2D (or 3D) map of the working plane area in the fields of view of these sensor blocks, the system can define a coordinate system and origin in the 2D map, such as described above. The system can then: locate a pixel—in an image recorded by a corresponding pixel in an optical sensor in a sensor block—in the 2D map; extract a coordinate of this image pixel in the coordinate system; associate this coordinate with an address of the pixel in the optical sensor in the sensor block; and store this association, such as in a lookup table or image matrix, as shown in FIG. 1. The system can repeat this process for each other pixel in the optical sensor in each other sensor block in order to calculate and store a real location (e.g., point, area) on the working plane in the designated space that falls in the field of view of each pixel in the optical sensor in each sensor block installed in the space. (In the foregoing variation described above, the system can implement similar methods and techniques to map sensor block pixels to discrete locations across the designated floorspace.)

10. Operation

Figure 5:
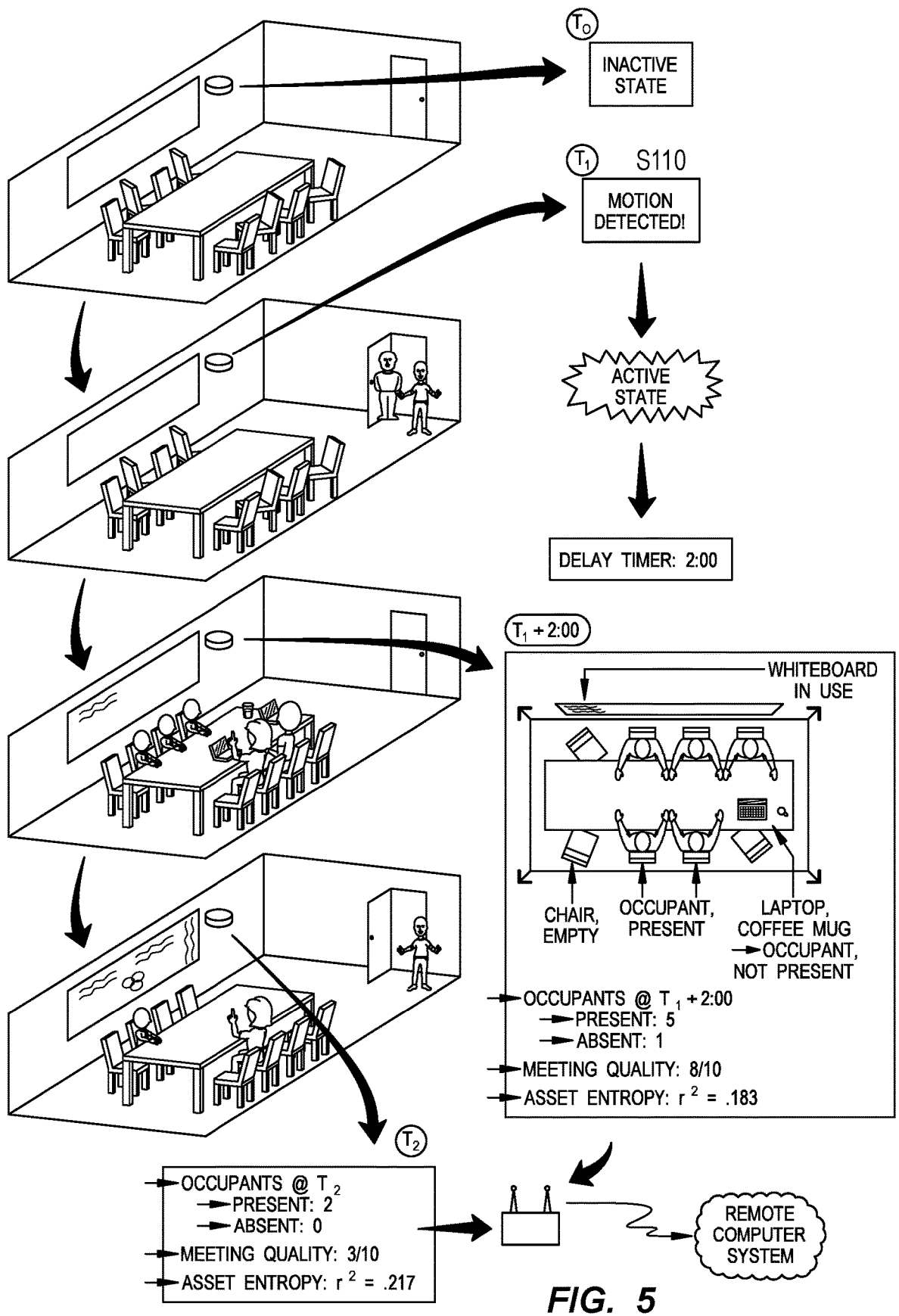
FIG. 5 is a flowchart representation of the method.

As described in U.S. application Ser. No. 15/973,445 and as shown in FIG. 5, the system can identify locations of objects—in the coordinate system—occupying the space based on such links between real locations and pixel fields of view.

For example, once the sensor blocks are installed over the floorspace, the sensor blocks can periodically record images and offload these images to local gateways also installed nearby. These local gateways can extract object (e.g., human occupant and asset) locations from these images and then pass these extracted (i.e., non-optical) data to the remote computer system, which can then combine these data with concurrent data from other sensor blocks and historical data to extract trends relating to use of the space by humans, movement of humans through the space, and/or use of assets within the space, etc. Thus, the system can, during a sampling interval, receive a set of images from the set of sensor blocks; and assemble the set of images into a set of composite images of the floorspace based on like features detected in images received from adjacent sensor blocks, in the set of sensor blocks; and identify assets present in each of the composite images, the location of each of the assets present in the set of composite images, and a timestamp corresponding to a particular composite image in which the asset is present.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
accessing a digital floorplan representing the floorspace;
extracting from the floorplan a set of floorplan features representing areas of interest in the floorspace;
based on geometries of fields of view of a set of sensor blocks, calculating a set of target locations relative to the floorplan that, when occupied by the set of sensor blocks:
locate the areas of interest in the floorspace within fields of view of the set sensor blocks; and
yield a minimum overlap in fields of view of adjacent sensor blocks in the set of sensor blocks; and
after installation of the set of sensor blocks over the floorspace, for each sensor block in the set of sensor blocks:
receiving, from the sensor block, an image of the floorspace;
based on overlaps in the image with images from other sensor blocks in the set of sensor blocks, estimating an installed location of the sensor block;
based on the installed location of the sensor block, mapping the sensor block to a target location in the set of target locations;
detecting a position deviation between the installed location of the sensor block and the target location of the sensor block; and
in response to the position deviation exceeding a position deviation threshold:
calculating an adjustment to the installed location of the sensor block; and
prompting an installer to execute the adjustment to the installed location of the sensor block.

2. The method of claim 1, further comprising calculating the geometries of the fields of view of the set of sensor blocks based on optical properties of the set of sensor blocks and a ceiling height for the floorspace.

3. The method of claim 1, wherein, for each sensor block in the set of sensor blocks, estimating the installed location of the sensor block comprises:
assembling the image and the images from other sensor blocks into a composite image of the floorspace based on like features detected in images received from adjacent sensor blocks in the set of sensor blocks; and
estimating the installed location based on the position of the image within the composite image.

4. The method of claim 1, wherein, for each sensor block in the set of sensor blocks:
receiving, from the sensor block, the image of the floorspace comprises receiving, from the sensor block, a feature-space image generated at the sensor block from an optical image of the floorspace, the feature-space image identifying a set of features extracted from the optical image;
estimating an installed location of the sensor block further comprises, based on like features between the feature-space image and feature-space images from other sensor blocks in the set of sensor blocks, estimating the installed location of the sensor block.

5. The method of claim 4, wherein receiving, from the sensor block, a feature-space image, the feature-space image identifying the set of features extracted from the optical image, the set of features comprising at least one of:
a desk space;
a seating location;
an anonymized person;
a cubical divider; and
a conference table.

6. The method of claim 1, further comprising:
accessing a set of floorspace parameters, the parameters comprising:
a ceiling height;
a maximum obstruction height; and
a floorspace variability;
calculating the geometries of the fields of view of the set of sensor blocks based on optical properties of the sensor block, the ceiling height for the floorspace, and the maximum obstruction height; and
determining the minimum overlap based on the geometries of the fields of view of the set of sensor blocks and the floorspace variability.

7. The method of claim 6, wherein:
extracting from the floorplan a set of floorplan features representing areas of interest in the floorspace comprises extracting a set of floorplan features representing areas of interest comprising a cubicle area;
calculating the geometries of the fields of view of the set of sensor blocks comprises:
calculating a first geometry of a field of view of a sensor block installed in the cubicle area; and
calculating a second geometry of a field of view of a sensor block installed outside of the cubicle area;
determining the minimum overlap based on the geometries of the fields of view of the set of sensor blocks and the floorspace variability comprises:
calculating a first minimum overlap of a sensor block installed in the cubicle area; and
calculating a second minimum overlap of a sensor block installed outside of the cubicle area; and
calculating a set of target locations comprises, based on the first geometry of the field of view of a sensor block installed in the cubicle area and the second geometry, calculating a set of target locations relative to the floorplan that, when occupied by the set of sensor blocks:
locate the areas of interest in the floorspace within fields of view of the set of sensor blocks;
yield the first minimum overlap in fields of view of adjacent sensor blocks in a subset of sensor blocks over the cubicle area in the set of sensor blocks; and
yield the second minimum overlap in fields of view of adjacent sensor blocks in a subset of sensor blocks.

8. The method of claim 1, further comprising:
extracting from the floorplan a set of obstructions in the set of floorplan features, each obstruction characterized by an obstruction location;
for each obstruction in the set of obstructions, generating a prompt requesting an obstruction height for the obstruction from a user; and
calculating the geometries of the fields of view of the set of sensor blocks based on optical properties of the sensor block, the ceiling height for the floorspace, and the obstruction height of each obstruction in the set of obstructions.

9. The method of claim 1, further comprising:
for a particular target location in the set of target locations, generating a visual identifier corresponding to the particular target location; and
after installation of the set of sensor blocks over the floorspace, for each sensor block in the set of sensor blocks:
  detecting the visual identifier in the image of the floorspace; and
  based on the installed location of the sensor block and the particular target location corresponding to the visual identifier, mapping the sensor block to a target location in the set of target locations.

10. The method of claim 9, further comprising, in response to the installed location differing from the particular target location corresponding to the visual identifier, generating a notification indicating a conflict between the installed location and the particular target location corresponding to the visual identifier and identifying the sensor block.

11. The method of claim 9, further comprising, in response to the installed location differing from the particular target location corresponding to the visual identifier, generating a prompt requesting selection of a mapping between a target location in the set of target locations and the sensor block.

12. The method of claim 9, further comprising, in response to the installed location differing from the particular target location corresponding to the visual identifier, automatically mapping the sensor block with a target location proximal the installed location.

13. The method claim 1, wherein calculating target locations relative to the floorplan comprises calculating the field of view of each sensor block based on an installation error probability distribution.

14. The method of claim 1, wherein:
calculating target locations relative to the floorplan comprises calculating target locations and target orientations relative to the floorplan for a set of sensor blocks that, when the set of sensor blocks are installed in locations and orientations over the floorspace corresponding to the target locations:
  locate the areas of interest of the floorspace within the fields of view of the sensor block in the set sensor blocks; and
  yield the minimum overlap in fields of view of adjacent sensor blocks in the set of sensor blocks based on the geometry of the field of view of the sensor block; and
after installation of the set of sensor blocks over the floorspace and for each sensor block in the set of sensor blocks, estimating the installed location of the sensor block based on the overlaps in the image with images from other sensor blocks in the set of sensor blocks comprises, after installation of the set of sensor blocks over the floorspace and for each sensor block in the set of sensor blocks:
  estimating the installed location of the sensor block based on the overlaps in the image with images from other sensor blocks in the set of sensor blocks; and
  estimating the installed orientation of the sensor block based on the overlaps in the image with images from other sensor blocks in the set of sensor blocks.

15. The method of claim 14:
wherein, for each sensor block in the set of sensor blocks, detecting the position deviation between the installed location of the sensor block and the target location of the sensor block comprises:
  detecting the position deviation between the installed location of the sensor block and the target location of the sensor block; and
  detecting an orientation deviation between the installed orientation and the target orientation; and
further comprising:
  in response to the orientation deviation exceeding an orientation deviation threshold, calculating an orientation adjustment to the installed orientation of the sensor block; and
  prompting the installer to execute the orientation adjustment to the installed orientation of the sensor block.

16. The method of claim 14, further comprising:
based on the installed location and the installed orientation of each sensor block, determining whether the areas of interest of the floorspace are located within the fields of view of the set sensor blocks; and
in response to determining the areas of interest of the floorspace are not located within the fields of view of the set of sensor blocks, calculating a modified set of target locations specifying a set of adjustments to installed location of the set of sensor blocks.

17. The method of claim 1, further comprising, after installation of the set of sensor blocks over the floorspace, for each sensor block in the set of sensor blocks:
receiving, from the sensor block, a set of images of the floorspace; and
based on the set of images and sets of images from other sensor blocks in the set of sensor blocks, estimating an installed location of the sensor block.

18. The method of claim 1, further comprising:
based on a set of installed locations comprising the installed location of each sensor block in the set of sensor blocks and the set of target locations, verifying that the set of installed locations:
  locates the areas of interest in the floorspace within fields of view of the set of sensor blocks; and
  yields the minimum overlap in fields of view of adjacent sensor blocks in the set of sensor blocks.

19. The method of claim 1, further comprising:
during a sampling interval, receiving a set of images from the set of sensor blocks;
assembling the set of images into a set of composite images of the floorspace based on like features detected in images received from adjacent sensor blocks, in the set of sensor blocks; and
identifying assets present in each of the composite images, the location of each of the assets present in the set of composite images, and a timestamp corresponding to a particular composite image in which the asset is present.

* * * * *